(12) United States Patent
Brockmann et al.

(10) Patent No.: US 8,863,676 B2
(45) Date of Patent: Oct. 21, 2014

(54) TWIN-ROW MULTIPLE VARIETY PLANTER AND METHOD OF USE

(75) Inventors: Thomas C. Brockmann, Bettendorf, IA (US); James R. Peterson, Annawan, IL (US); Donald K. Landphair, Bettendorf, IA (US); David J. Rylander, Victoria, IL (US); Michael E. Frasier, Iowa City, IA (US); Elijah B. Garner, Bettendorf, IA (US)

(73) Assignee: Deere & Company, Moline, IL (US)

( * ) Notice: Subject to any disclaimer, the term of this patent is extended or adjusted under 35 U.S.C. 154(b) by 188 days.

(21) Appl. No.: 13/547,682

(22) Filed: Jul. 12, 2012

(65) Prior Publication Data

US 2014/0014013 A1    Jan. 16, 2014

(51) Int. Cl.
*A01C 7/08*    (2006.01)
*A01C 7/10*    (2006.01)

(52) U.S. Cl.
USPC .......................................... 111/186

(58) Field of Classification Search
USPC ................................ 111/186, 175
See application file for complete search history.

(56) References Cited

U.S. PATENT DOCUMENTS

| | | | |
|---|---|---|---|
| 5,170,909 | A | 12/1992 | Lundie et al. |
| 5,915,313 | A | 6/1999 | Bender et al. |
| 6,193,175 | B1 | 2/2001 | Andersson et al. |
| 6,267,067 | B1 | 7/2001 | Mayerle et al. |
| 6,520,100 | B1 | 2/2003 | Spooner, Sr. et al. |
| 6,527,205 | B2 | 3/2003 | Andersson et al. |
| 6,609,468 | B1 | 8/2003 | Meyer et al. |
| 6,845,724 | B2 | 1/2005 | Mayerle et al. |
| 7,021,224 | B2 | 4/2006 | Mayerle et al. |
| 7,025,010 | B2 | 4/2006 | Martin et al. |
| 7,140,310 | B2 | 11/2006 | Mayerle et al. |
| 7,347,149 | B2 | 3/2008 | Mayerle et al. |
| 7,353,760 | B2 | 4/2008 | Mayerle et al. |
| 2005/0103244 | A1 | 5/2005 | Mayerle et al. |

FOREIGN PATENT DOCUMENTS

| | | |
|---|---|---|
| EP | 1920647 A1 | 5/2008 |
| WO | 9842178 A1 | 10/1998 |
| WO | 2010129463 A2 | 11/2010 |

OTHER PUBLICATIONS

European Search Report, dated Nov. 4, 2013 (7 pages).

*Primary Examiner* — Christopher J Novosad

(57) ABSTRACT

A twin-row planter is shown configured to plant different varieties of seed. Each planting unit of the twin-row is separately controlled to turn on or off the seed meter of the planting unit. This enables operation of only one seed meter of the two planting units in each twin-row. With the planting units supplied with different varieties of seed, the variety being planted can be controlled by controlling the seed meters of the two planting units within the twin-row.

6 Claims, 4 Drawing Sheets

TWIN-ROW MULTIPLE VARIETY PLANTER AND METHOD OF USE

FIELD

An agricultural planting machine is shown and in particular a machine for planting two varieties of a crop in field

BACKGROUND

Advances in seed science and site-specific farming have shown that crop yields can be increased in certain situations by planting a field with two or more varieties of seed rather than planting the entire field with only one variety. Differences within one field such as soil type, elevation, moisture, weed pressure and/or pests can make it beneficial to plant different seed varieties in different locations within a field. The use of global positioning information enables machines to be controlled based on location within the field.

While different areas within a field can be distinguished with a bright line, it is difficult to make a sudden change in seed type without some blending of seed variety over a considerable distance in the field. One device that makes a clear transition in seed types is disclosed in U.S. Pat. No. 6,845,724. There, a planter row unit 25 is shown having two seed meters 26. A transition in seed types can be made suddenly, with no blending, by turning off one meter and turning on the other meter. What is not shown, however, is how to feed seed from two meters into a single seed furrow using a single furrow opener, seed tube and furrow closing mechanism. Feeding a single seed tube with seed from one of two meters and maintaining seed spacing accuracy is a challenge.

DETAILED DESCRIPTION

Figure 1:
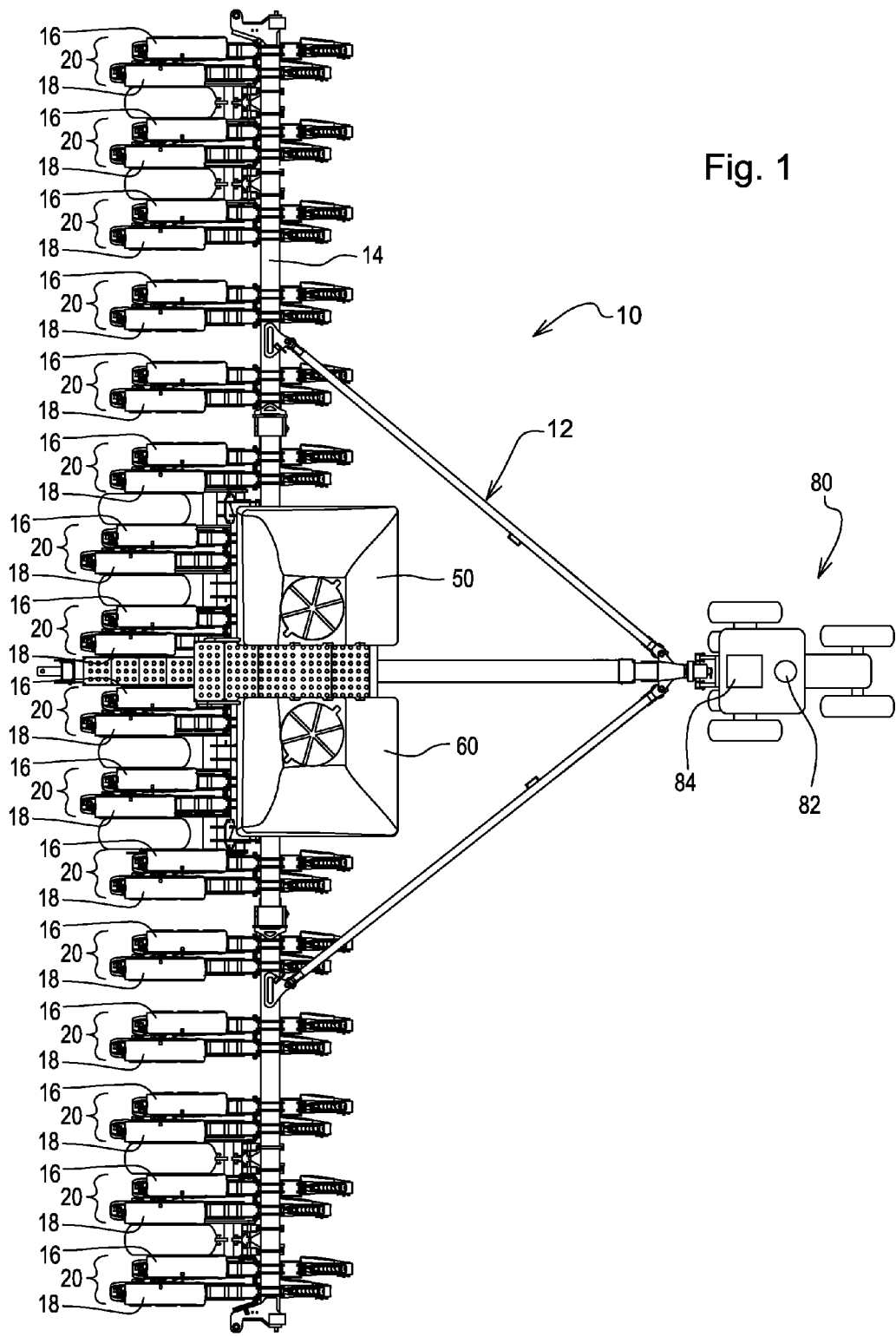
FIG. 1 is a plan view of a planter.

With reference to FIG. 1, a twin-row planter 10 is shown adapted for planting two different varieties of seed depending on field location. The planter 10 has a frame 12 including a tool bar 14. A number of planting units 16 and 18 are mounted to the tool bar in pairs forming twin-rows 20. In the planter 10 shown, there are sixteen twin-rows 20. Each twin-row has a first planting unit 16 and a second planting unit 18. The first and second planting units are generally identical. The second planting 18 units are mounted further rearward from the tool bar than the first planting units 16 for proper clearance between the two closely spaced planting units. Planter 10 is adapted to be towed across a field by a tractor 80 shown schematically. Tractor 80, or the planter 10, is equipped with a receiver 82 to receive location signals from a satellite based or ground based positioning system or a combination of signals from both a satellite based or ground based positioning system. A controller 84 then controls the implement 10 based on location and may also be used to control, e.g. steer the tractor 80. Such receivers and control controllers are known, see for example the John Deere StarFire™ receiver and John Deere AutoTrac™ Precision Guidance system.

Figure 2:
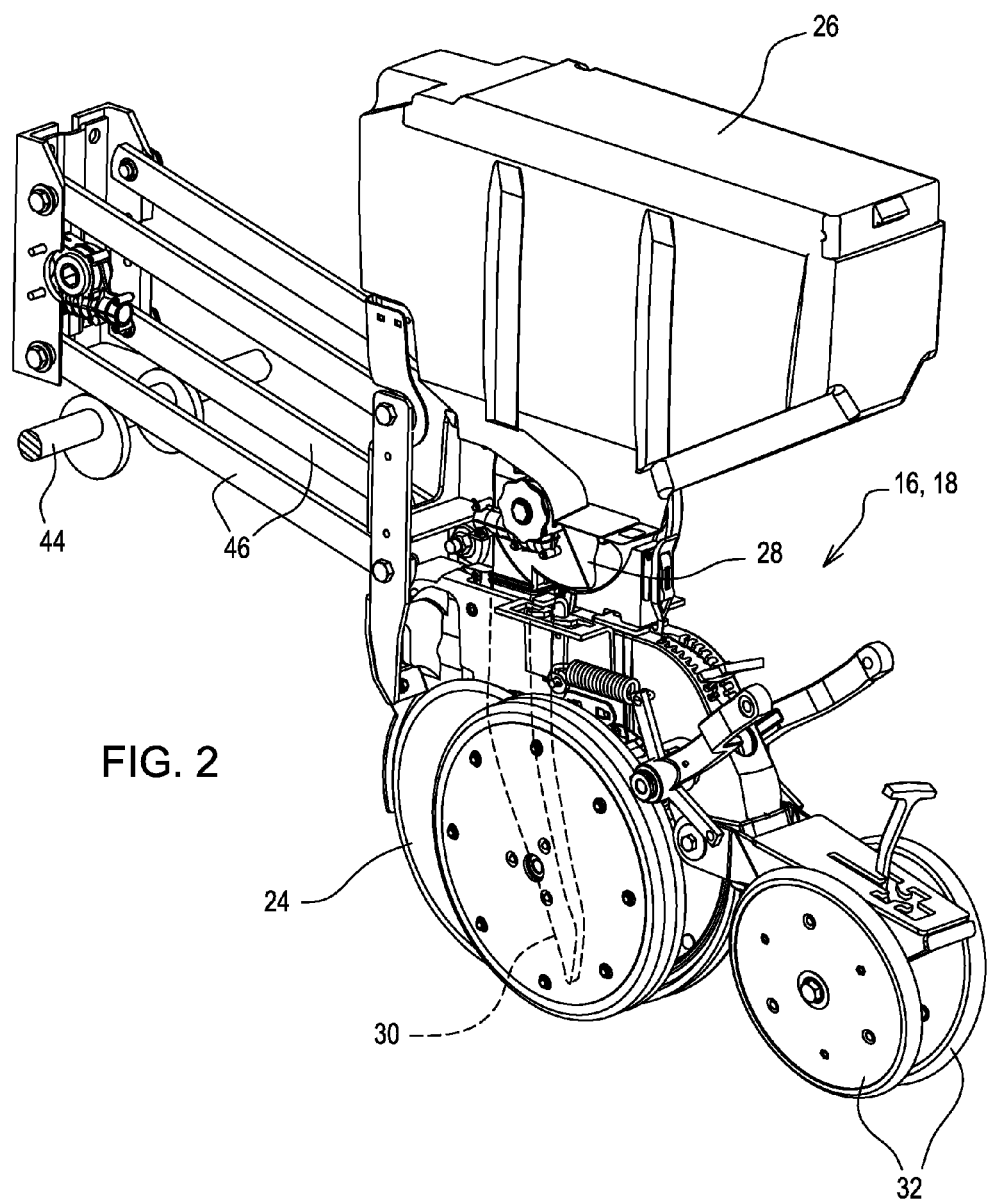
FIG. 2 is a perspective view of a planting unit of the planter of FIG. 1.

Each planting unit 16 and 18 has, as shown in FIG. 2, an opener 24, for forming a furrow in the soil, a hopper 26 for holding seed, a seed meter 28 for singulating seed and delivering individual seeds sequentially to a device 30 for delivering seed from the meter to the furrow in the soil. The seed delivery device 30 is shown as a seed tube through which seed drops by gravity. However, other delivery devices, such as mechanical devices can be used. Hoppers 26 are relatively large and are manually filled with seed. Each hopper 26 of the first planting units 16 is filled with a first seed variety while each seed hopper 26 of the second planting units 18 is filled with a second seed variety. A furrow closer 32 is also provided to close the furrow over the deposited seed.

Figure 3:
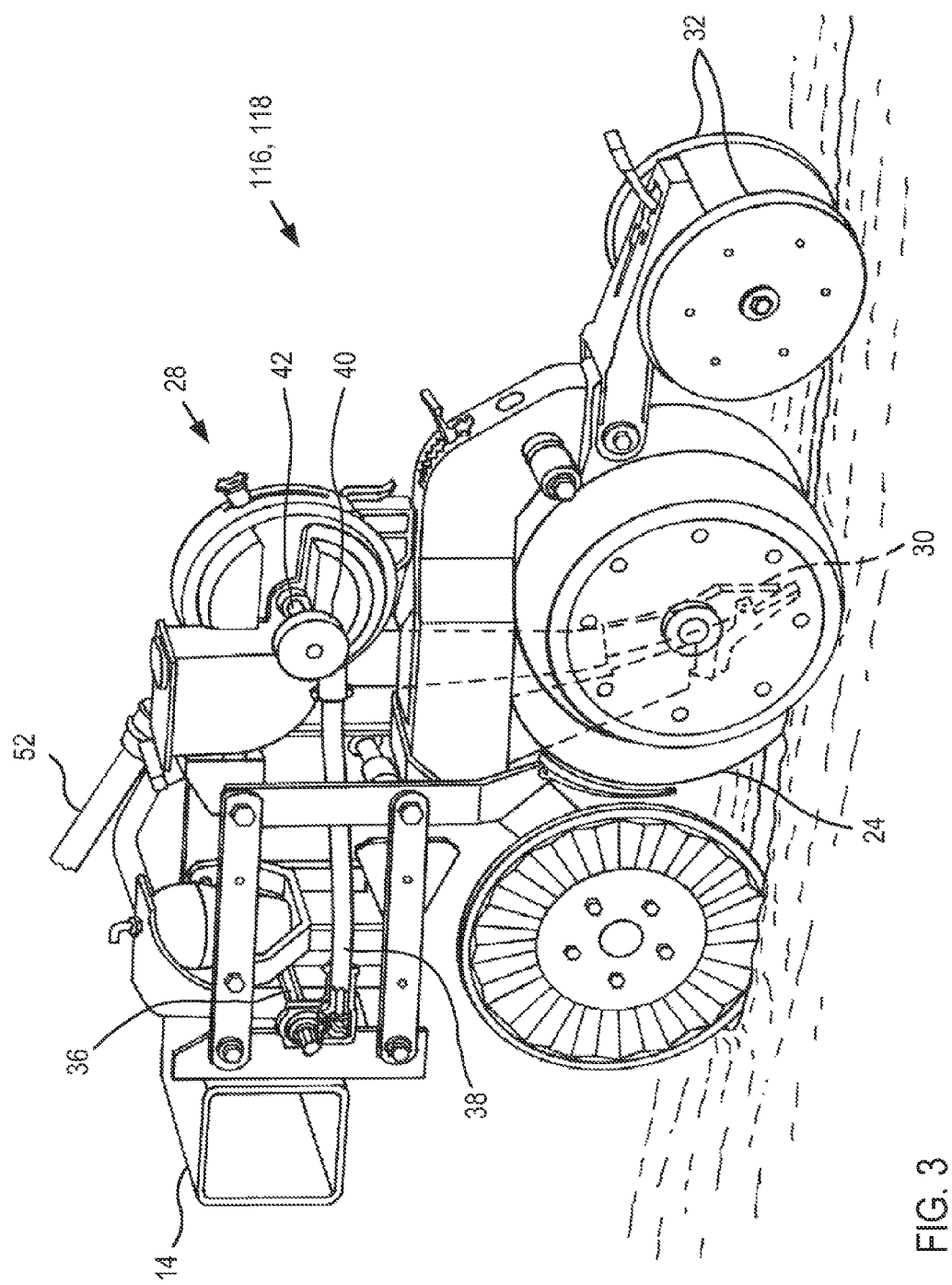
FIG. 3 is a perspective view of an alternative planting unit.

Referring to FIG. 3, a different configuration of first and second planting units 116, 118 is shown. The planting units 116, 118 have openers 24, seed meters 28, delivery device 30 and closers 32 similar or identical to the planting units 16, 18. The seed hopper 126 however differs and is considerably smaller, holding less seed. The filling of the seed hoppers 126 will be described below.

The seed meters 28 are driven by a cross shaft 36 which drives a flexible cable 38 shown only in FIG. 3. A right angle gearbox 40 connects the cable 38 to the meter shaft 42. The gearbox 40 contains a clutch mechanism that enables the cable to be selectively disconnected from the meter shaft 42 to selectively drive the meter 28. Various clutch mechanism can be used for this purpose, the most common types being pneumatic or electric. Alternatively, the clutch can be located in the drive connection between the cross shaft 36 and cable 38. Chain drives are also known in place of the cable 38. Clutch mechanisms are known for chain drives. Alternatively, the meters can be driven by individual electric motors that can be turned on and off to drive or not drive the seed meters. The same meter drive mechanisms are available for the meters of planting units 16, 18 as well as the meters of planting units 116,118.

Various types of seed meters are known. One common form of seed meter is a vacuum meter, one example of which is shown in U.S. Pat. No. 5,170,909, hereby incorporated by reference. Such a seed meter has a disk within a meter housing. The disk has a circular array of apertures therein. A puddle of seed rests on one side of the disk in a lower portion of the housing while vacuum is applied to the other side of the disk. As the disk rotates past the seed puddle, the vacuum causes seed to be adhered to the apertures. The individual seeds on the apertures are then carried to a release location where the vacuum is cut-off and the seeds fall sequentially to the delivery device 30. The meter can be turned on and off by controlling the meter drive as described above, causing the disk to rotate or not rotate. With a vacuum meter, the meter can also be turned on or off by controlling the vacuum. If the vacuum is shut-off or disconnected from the disk, seeds will fall off the disk and return to the seed puddle while the disk continues to rotate and no further seeds will be picked-up by the disk.

Figure 4:
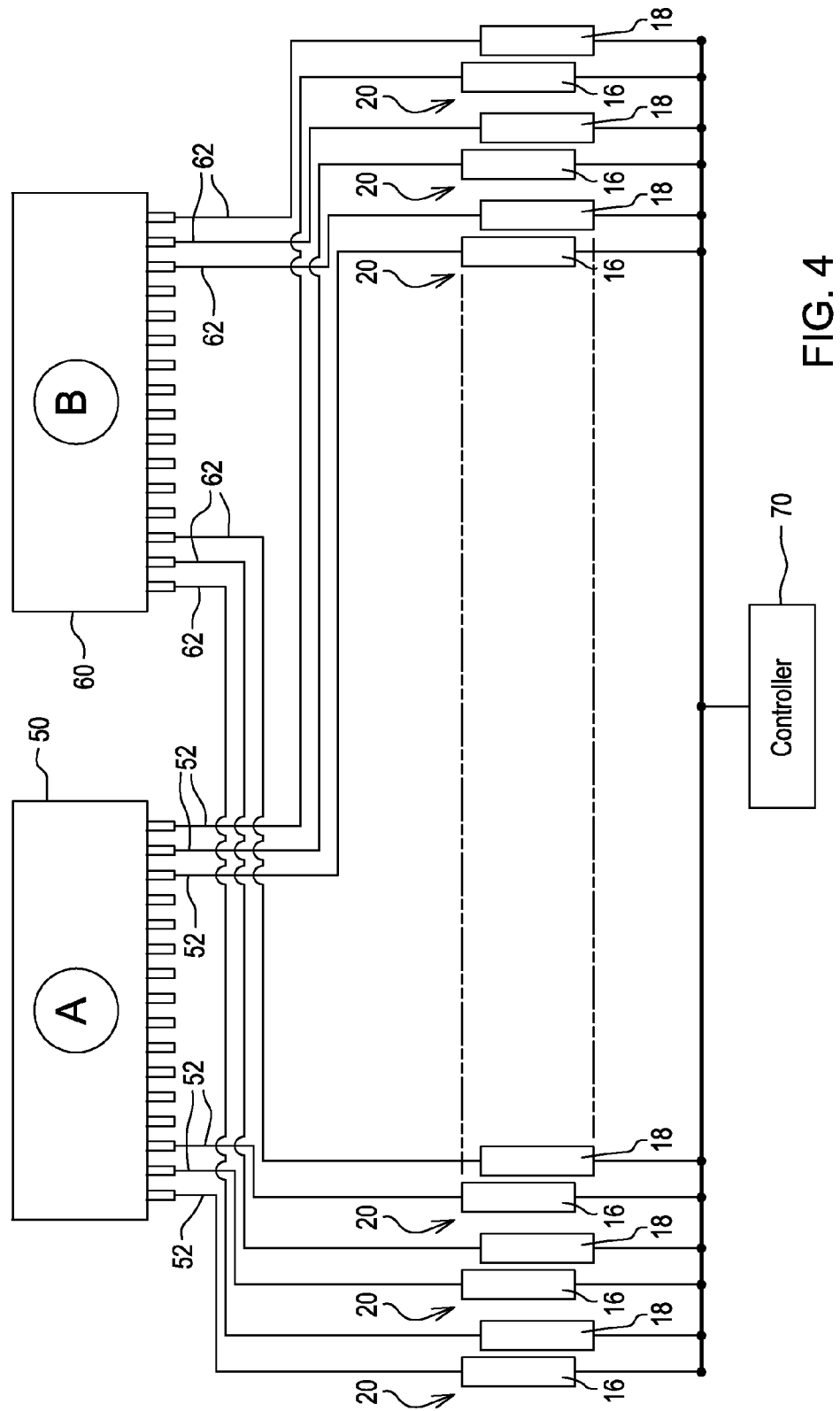
FIG. 4 is a schematic diagram of a product on demand delivery system for supplying seed to the planting units shown in FIG. 3.

Seed is delivered to the hoppers 126 through a product on demand delivery system such as that described in U.S. Pat. Nos. 6,609,468 and 7,025,010, assigned to the assignee of the present application and hereby incorporated by reference. The product on demand delivery system is shown schematically in FIG. 4. A first primary seed hopper 50 is connected through conduits 52 to the hoppers 126 of the first planting units 16 or 116. A second primary seed hopper 60 is connected through conduits 62 to the hoppers 126 of the second planting units 18 or 118. The first primary hopper 50 is filled with a first seed variety while the second primary seed hopper 60 is filled with a second seed variety. Seed is delivered from the primary hoppers to the planting units pneumatically.

The seed meters are operated such that only one seed meter of each twin-row 20 is operated at a given time. A controller 70 is connected via a communications bus or other connection to the clutches, electric motors, etc that control the seed meters to actuate the seed meters or to not actuate the seed meters. The controller 70 receives position signals from a global or local positioning system 84 and actuates the seed meters based on a prescription map of where each seed variety is to be planted in the field. When the seed variety is changed, one seed meter of the row is turned off and the other seed meter is turned on. By switching the seed meters on or off, with each seed meter in a twin-row 20 planting a different variety, the change in variety is instantaneous, with no blending of the two varieties over a distance in the field. The lack of blending is accomplished through using two separate seed meters rather than using one seed meter and supplying different varieties of seed to the common meter. Blending occurs when a second variety of seed is supplied to the hopper on the planting unit while some of the first variety of seed remains in the hopper.

To reduce total draft of the planter and wear on the row units, it is desirable to raise the row units 16 or 18 that are not in use. This can be accomplished by a cam shaft 44 mounted to the tool bar 14 and positioned beneath the links 46 coupling the row unit to the tool bar. The cam shaft 44 has cams 48 that engage the lower surface of the links 46. Upon rotation of the shaft 44 the cams 48 lift the row unit. When doing so, the pressure in a pneumatic downforce actuator, such as the air bag 54 shown in FIG. 3, is relieved to allow the row units to be raised. Other mechanisms can be used to raise the row units, including lift cylinders, rock shafts, etc. With individual meter drive clutches or electric motors, etc, each twin-row can be separately controlled for seed variety. The twin-rows can also be controlled in groups of adjacent twin-rows. This can be accomplished by controlling clutches or motors, etc on a group of adjacent twin-rows simultaneously. Alternatively, groups of row units can be mechanically controlled by different cross shafts 36 for the first planting units and the second planting units and having separate cross shafts 36 for groups of planting units. In this manner, all planting units within one group are under a common control through a common cross shaft.

By switching between planting units within a twin-row of two planting units, there will be a lateral shift in the crop row placement when making a variety change. All rows of the planter can be controlled together, meaning that in each twin-row, the same row unit will be operating. To assist in later field operations, such as spraying and harvesting, the controller 84 can laterally shift the planter 10 to keep the planted rows in a straight line even though the row units within the twin row have switched. If the twin-rows are controller in groups less than the entire width of the planter, it is helpful to control groups of adjacent twin-rows together and select the number of twin-rows in each group to be equal the number of rows to be harvested in a single pass of a harvesting machine. This enables the harvester head to be centered on all crop rows.

The use of a twin-row planter allows for instantaneous switching between varieties without the complication of feeding seed from two different meters into a common seed tube as proposed in the above patent mentioned patent.

Having described the planter, it will become apparent that various modifications can be made without departing from the scope of the invention as defined in the accompanying claims.

What is claimed is:

1. A multiple variety planter comprising
a frame;
a plurality a planting units mounted the frame, each planting unit having an opener for forming a furrow in the soil, an adjustable depth control gauge wheel assembly for controlling the depth of the opener in the soil, a hopper for holding a quantity of seed, a seed meter and a delivery device to deliver seeds to the furrow, the planting units being arranged in twin-rows wherein each row has a pair of first and second closely spaced planting units with each row spaced from an adjacent row a greater distance than the first and second planting units within a row are spaced from one another;
means for selectively driving either the first or the second seed meters in each row; and
means for switching between driving the first or the second seed meters in each row.

2. The multiple variety planter of claim 1 further comprising means for lifting row units not in use.

3. A multiple variety planter comprising
a frame;
a plurality a planting units mounted the frame, each planting unit having an opener for forming a furrow in the soil, an adjustable depth control gauge wheel assembly for controlling the depth of the opener in the soil, a mini-hopper for holding a small quantity of seed, a seed meter and a delivery device to deliver seeds to the furrow, the planting units being arranged in twin-rows wherein each twin-row has a pair of first and second closely spaced planting units with each twin-row spaced from an adjacent twin-row a greater distance than the first and second planting units within a twin-row are spaced from one another; and
a seed on demand delivery system comprising first and second primary seed hoppers, a plurality of first conduits extending from the first primary seed hopper to each mini-hopper on each first planting unit of each twin-row to deliver a first variety of seed to the first planting units and a plurality of second conduits extending from the second primary seed hopper to each mini-hopper on each second planting unit of each twin-row to deliver a second variety of seed to the second planting units; and
means for selectively driving first or second seed meters in each of the pairs of planting units.

4. The method of operating a planter as defined in claim 3 further comprising operating the rows of planting units in groups of multiple rows wherein within each group of rows all of the first or all of the second seed meters are operated simultaneously and wherein the number of rows in each group is equal to the number of rows expected to be harvested in a single pass of a harvesting machine.

5. The method of operating a planter as defined in claim 3 further comprising upon switching operation between the first and second seed meters laterally shifting the location of the planter to maintain a substantially straight and continuous planted row.

6. A method of operating a planter, the planter having a plurality of planting units arranged in twin-rows wherein each row has a pair of first and second closely spaced planting units with each row spaced from an adjacent row a greater distance than the two planting units within a row are spaced from one another, each planting unit having an opener for forming a furrow in the soil, an adjustable depth control gauge wheel assembly for controlling the depth of the opener in the soil, a mini-hopper for holding a quantity of seed, a seed meter and a device for delivering seed to the furrow, the planter further having a seed on demand delivery system having first and second primary hoppers coupled to the planting units to delivery seed from the first primary hopper to the mini-hopper on the first planting unit of each row and to deliver seed from the second primary hopper to the mini-hopper on the second planting unit of each row, the method comprising the steps of:

filing the first primary hopper with a first variety of seed;

filing the second primary hopper with a second variety of seed;

operating the seed on demand delivery system to deliver the first variety of seed to the mini-hoppers of the first planting units and delivering the second variety of seed to the mini-hoppers on the second planting units;

while traversing a field, operating one of the first or the second seed meters in the first and second planting units of each row; and periodically switching operation between the first and second seed meters within each row.

\* \* \* \* \*